(12) United States Patent
Deogun et al.

(10) Patent No.: US 10,397,977 B2
(45) Date of Patent: Aug. 27, 2019

(54) METHODS AND SYSTEMS FOR CONFIGURING TIMERS IN LTE NETWORKS

(71) Applicant: Samsung Electronics Co., Ltd, Gyeonggi-do (KR)

(72) Inventors: Pravjyot Singh Deogun, Bangalore (IN); Anshuman Nigam, Bangalore (IN); Saidhiraj Amuru, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 20 days.

(21) Appl. No.: 15/582,500

(22) Filed: Apr. 28, 2017

(65) Prior Publication Data

US 2017/0318566 A1    Nov. 2, 2017

(30) Foreign Application Priority Data

Apr. 28, 2016  (IN) .............................. 201641014815
Apr. 19, 2017  (IN) .............................. 201641014815

(51) Int. Cl.
*H04W 76/28*    (2018.01)
(52) U.S. Cl.
CPC .................................. *H04W 76/28* (2018.02)
(58) Field of Classification Search
CPC ...................................................... H04W 76/28
See application file for complete search history.

(56) References Cited

U.S. PATENT DOCUMENTS

| 2009/0238105 A1* | 9/2009 | Wu .................. H04W 52/0216 370/311 |
|---|---|---|
| 2014/0071860 A1 | 3/2014 | Susitaival et al. |
| 2014/0119198 A1* | 5/2014 | Lee .................. H04W 52/0216 370/241 |
| 2015/0296561 A1 | 10/2015 | Kim et al. |
| 2015/0359034 A1 | 12/2015 | Kim et al. |
| 2016/0044708 A1 | 2/2016 | Lin et al. |

(Continued)

OTHER PUBLICATIONS

3GPP TSG RAN WG1 Meeting #84 R1-160808 St Julian's Malta, Feb. 15-19, 2016 Panasonic Discussion on eMTC USS starting subframes and DRX configuration.*

(Continued)

*Primary Examiner* — Kevin M Cunningham

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services.
Methods and systems for controlling timers in LTE networks. UE configures a length of the at least one timer, configure at least one start position for the at least one timer, wherein the start position is aligned with a starting subframe of a physical downlink control channel (PDCCH) search space and started when a previous transmission is completed; and stopping, by the UE, the at least one timer when a PDCCH is successfully decoded.

15 Claims, 12 Drawing Sheets

(56) References Cited

U.S. PATENT DOCUMENTS

2017/0134124 A1* 5/2017 Lee ................... H04L 1/1812
2017/0202054 A1* 7/2017 Rathonyi ............. H04L 1/1812

OTHER PUBLICATIONS

3GPP TSG-RAN WG2 Meeting #93bis R2-162332 Dubrovnik Croatia, Apr. 11-15, 2016 Huawei, HiSilicon, Neul DRX in Connected Mode.*
Ericsson, "Introduction of NB-IoT in 36.321", R2-164521, 3GPP TSG-RAN2 Meeting #94, Nanjing, China, May 23-27, 2016, 32 pages.
Huawei, "Introduction of NB-IoT in 36.331", RP-161211, 3GPP TSG-RAN Meeting #72, Busan, South Korea, Jun. 13-16, 2016, 121 pages.
International Search Report dated Aug. 8, 2017 in connection with International Patent Application No. PCT/KR2017/004606.
Written Opinion of the International Searching Authority dated Aug. 8, 2017 in connection with International Patent Application No. PCT/KR2017/004606.
"3rd Generation Partnership Project; Technical Specification Group Radio Access Network; Evolved Universal Terrestrial Radio Access (E-UTRA); Medium Access Control (MAC) protocol specification (Release 13)", 3GPP TS 36.321 V13.1.0, Mar. 2016, 85 pages.

* cited by examiner

METHODS AND SYSTEMS FOR CONFIGURING TIMERS IN LTE NETWORKS

CROSS-REFERENCE TO RELATED APPLICATION(S) AND CLAIM OF PRIORITY

The present application is related to and claims the priority under the priority under 35 U.S.C. § 119(a) of an Indian provisional patent application No. 201641014815 filed on Apr. 28, 2016, and an Indian complete patent application No. 201641014815 filed on Apr. 19, 2017 in the Indian Patent Office, the entire disclosures of which are incorporated herein by reference.

TECHNICAL FIELD

The embodiments herein generally relate to the field of long term evolution (LTE) technology in wireless communications and more particularly to timers in the LTE wireless communication networks.

BACKGROUND

To meet the demand for wireless data traffic having increased since deployment of 4G (4th-Generation) communication systems, efforts have been made to develop an improved 5G (5th-Generation) or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access(NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

Currently, long term evolution (LTE) technology is being widely implemented by wireless communication systems. In LTE, without discontinuous reception (DRX), a user equipment (UE) has to be awake all the time in order to decode downlink data, as the data in the downlink may arrive at any time. This means that UE has to monitor the physical downlink control channel (PDCCH) in every sub-frame to check if there is downlink data available. This has serious impact on the power consumption of the UE. However in presence of the DRX, the UE discontinuously monitors the PDCCH. The occasions of monitoring PDCCH are configured by the base station (or eNodeB) using multiple timers as illustrated in FIG. 1. The timers include an on duration timer that indicates the time that the UE remains in DRX active state after start of DRX cycle. Further, a drx-Inactivity timer indicates the time that the UE remains in DRX active state after receiving a PDCCH with downlink control information (DCI) indicating new transmission. A drx-Retransmission timer indicates the time that the UE remains in DRX active state to receive PDCCH for retransmission scheduling. A ra-Response timer indicates a time for which the UE is in active state after transmission of Random Access Preamble. A mac-Contention resolution timer indicates a time for which the UE is in active state after transmission of Msg-3. Further, a drxCycle indicates a cyclic timer (which is restarted at each expiry point) indicating the DRX cycle. A drxCycleTimer indicates that at the end of this timer, the UE switches from a short DRX cycle (i.e. short drxCycle value) to a long DRX cycle (i.e. long drxCycle value). Further, a drxStartOffset indicates the starting sub-frame offset of the DRX cycle.

In an example scenario, consider a cellular internet of things (IoT) environment, it is expected that because of increased repetition, physical downlink control channel (PDCCH), physical downlink shared channel (PDSCH) and physical uplink shared channel (PUSCH) transmissions may extend more than 1 sub-frame. Also, scheduling gap of more than 1 sub-frame may exist between end of PDCCH transmission and start of corresponding scheduled PDSCH/PUSCH transmission. FIG. 2 illustrates a PDCCH scheduling gap, where PDCCH-1 provides scheduling information of PDSCH-1; PDCCH-2 provides scheduling information of PDSCH-2, and so on. These factors render the current procedure of DRX operation ineffective for cellular IoT. Hence, new mechanism needs to be defined for the DRX operation for cellular IoT.

SUMMARY

To address the above-discussed deficiencies, it is a primary object to provide methods and systems for configuring the length of timers in a user equipment (UE), and the amount of time that the UE remains in active state while the timer is running.

Another object of the embodiments herein is to define at least one DRX procedure for a discontinuous reception (DRX) operation of a User Equipment (UE), wherein one or more proposed DRX procedures may be applied when there exists increased repetition of PDCCH, PDSCH and PUSCH transmission that may extend to more than one sub-frame and a scheduling gap of more than one sub-frame that exists between end of PDCCH transmission and start of corresponding scheduled PDSCH/PUSCH transmission.

Another object of the embodiments herein is to provide a method for maintaining power consumption of the UE during the DRX operation of the UE.

Accordingly the invention provides a method for configuring at least one timer by a user equipment (UE) in a long term evolution (LTE) network, the method comprising configuring length of at least one xTimer by the UE; configuring at least one start position for the at least one xTimer by the UE, wherein the start position is aligned with starting subframe of a physical downlink control channel (PDCCH) search space and started when a previous transmission is completed; and stopping the at least one xTimer by the UE, on the UE successfully decoding the PDCCH.

Accordingly the invention provides a user equipment (UE) configured for configuring length of at least one xTimer; configuring at least one start position for the at least one xTimer, wherein the start position is aligned with a physical downlink control channel (PDCCH) search space and started when a previous transmission is completed; and stopping the at least one xTimer, on the UE successfully decoding the PDCCH.

These and other aspects of the example embodiments herein will be better appreciated and understood when considered in conjunction with the following description and the accompanying drawings. It should be understood, however, that the following descriptions, while indicating example embodiments and numerous specific details thereof, are given by way of illustration and not of limitation. Many changes and modifications may be made within the scope of the example embodiments herein without departing from the spirit thereof, and the example embodiments herein include all such modifications.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
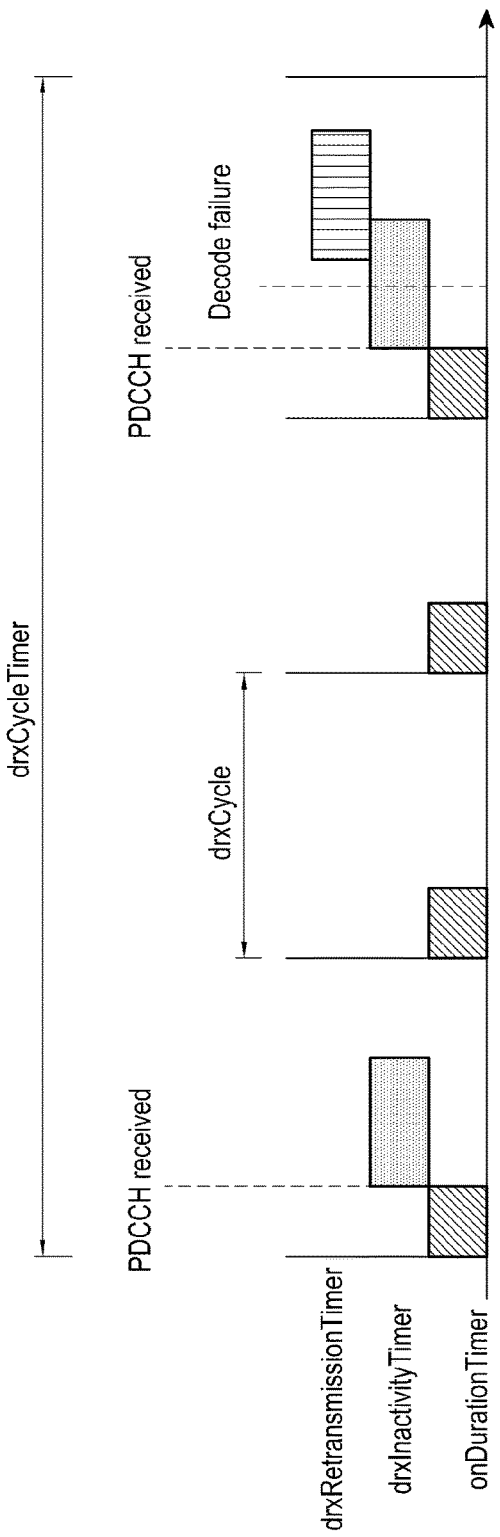
FIG. 1 illustrates an example occasions of monitoring PDCCH as configured by a base station (or eNodeB) using multiple timers according to embodiments of the present disclosure.
Figure 2:
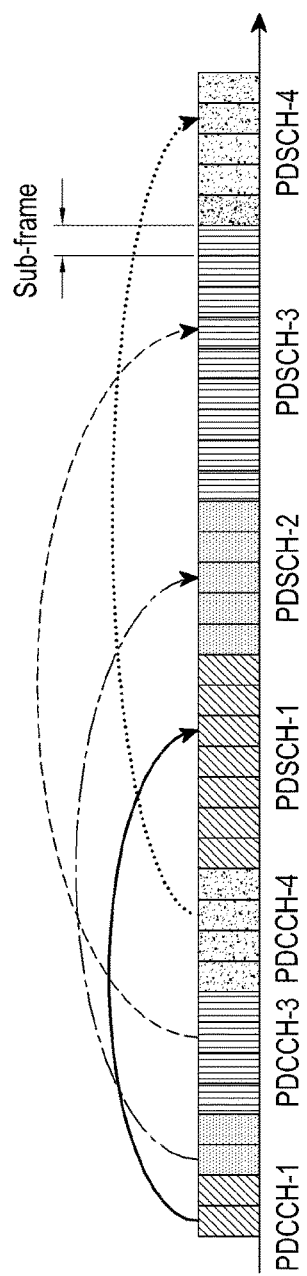
FIG. 2 illustrates an example PDCCH scheduling gap according to embodiments of the present disclosure.

FIGS. 1 through 18C, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device.

The example embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The description herein is intended merely to facilitate an understanding of ways in which the example embodiments herein can be practiced and to further enable those of skill in the art to practice the example embodiments herein. Accordingly, this disclosure should not be construed as limiting the scope of the example embodiments herein.

The embodiments herein disclose methods and systems for configuring the length of a timer in a user equipment (UE), and the amount of time that the UE remains in active state while the timer is running. Referring now to the drawings, and more particularly to FIGS. 3 through 18, where similar reference characters denote corresponding features consistently throughout the figures, there are shown example embodiments.

The user equipment (UE) as disclosed herein can be a device configured to use at least one long term evolution (LTE) based communication network. Examples of the UE can be mobile phones, smart phones, tablets, laptops, wearable computing devices, Internet of Things (IoT) devices, vehicle infotainment systems, and so on.

A physical downlink control channel (PDCCH) search space may refer to either UE specific search space for PDCCH, which is configured by dedicated signaling to the UE, or it may refer to the cell specific search space for PDCCH of the UE, which is configured by system information. The starting subframe of a 'PDCCH search space' can be referred to as a PDCCH occasion. The UE is not required to monitor both the search spaces simultaneously. If PDCCH for the UE is expected in UE specific search space, then the PDCCH search space refers to UE specific search space. If PDCCH for the UE is expected in cell specific search space, then the PDCCH search space refers to cell specific search space. The term 'PDCCH search space interval' can also be referred to as a "PDCCH period (pp)."

The term 'xTimer' as referred to herein can refer to at least one of an onDurationTimer, drx-InactivityTimer, drx-RetransmissionTimer, ra-ResponseTimer, mac-ContentionResolutionTimer, drxCycle, drxCycleTimer, or any other discontinuous reception (DRX) timer.

Embodiments herein use the term "sub-frame" to indicate the start (or trigger) point and end point of the timers with the assumption that scheduling unit is sub-frame, but the same procedure can be applied for the case when scheduling unit is slot or mini-slot or any other scheduling unit.

Embodiments herein use the term "ms" to define length of certain parameters (for example, $X_u$, $X_d$, and so on), but the same procedure can be applied for the case when different units are used for the parameters (for example, slot length/mini-slot length/symbol length, and so on).

Embodiments herein enable the UE to configure the length of at least one timer according to number of PDCCH occasions of the UE for reliable and optimal PDCCH decoding. In an embodiment herein, the length of DRX and MAC timers can be configured as a factor of PDCCH search space interval/period of the UE. Since PDCCH occasion frequency for each UE may be different, hence timer lengths can be UE specific. Embodiments herein enable the UE to configure delayed start criteria, wherein the start position of the timers is aligned with PDCCH occasions, and the timers are started only when the previous transmission (PDCCH+PUSCH/PDSCH) is completed. For example, the onDurationTimer can be aligned with PDCCH occasion, and the drxInactivityTimer and drxRetransmissionTimer can be started after PUSCH transmission. Embodiments herein enable the UE to configure early stoppage criteria/position, wherein the DRX timers are stopped when PDCCH is successfully decoded, hence ensuring that UE does not monitor for PDCCH when not required. For example, onDurationTimer, drxInactivityTimer and drxRetransmissionTimer can be stopped, when the PDCCH is successfully decoded.

Figure 3:
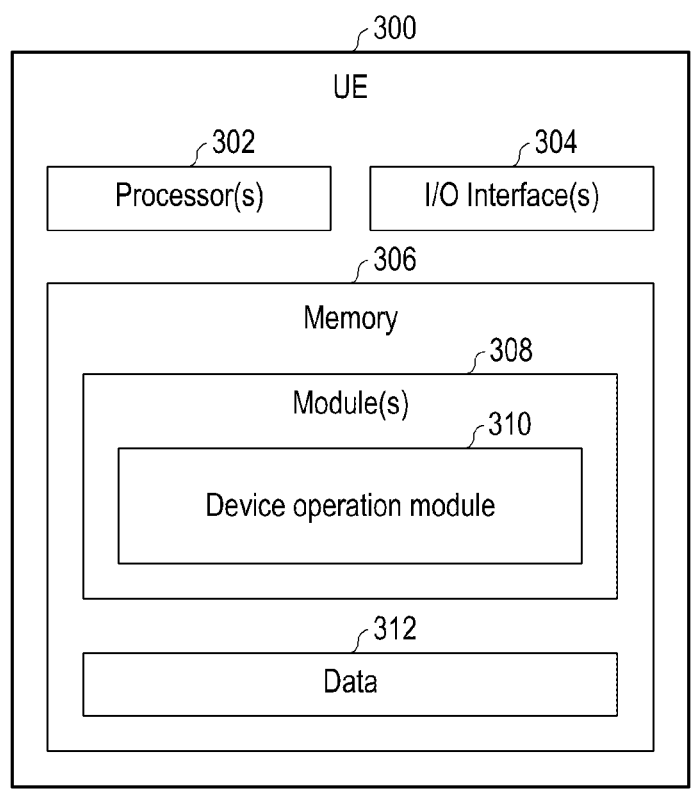
FIG. 3 illustrates an example UE for configuring a length of a DRX timer in a UE, and an amount of time that the UE remains in active state while the DRX timer is running according to embodiments of the present disclosure.

FIG. 3 illustrates an example UE 300 for configuring a length of a DRX timer in the UE, and an amount of time that the UE remains in active state while the DRX timer is running. Referring to FIG. 3, the UE 300 is illustrated in accordance with an embodiment of the present subject matter. In an embodiment, the UE 300 may include at least one processor 302, an input/output (I/O) interface 304 (herein a configurable user interface), and at least one memory 306. The at least one processor 302 may be implemented as one or more microprocessors, microcomputers, microcontrollers, digital signal processors, central processing units, state machines, logic circuitries, and/or any devices that manipulate signals based on operational instructions. Among other capabilities, the at least one processor 302 is configured to fetch and execute computer-readable instructions stored in the memory 306.

The I/O interface 304 may include a variety of software and hardware interfaces, for example, a web interface, a graphical user interface such as a display screen, a camera interface for the camera sensor (such as the back camera and the front camera on the UE 300), and the like.

The I/O interface 304 may allow the UE 300 to communicate with other devices. The I/O interface 304 may facilitate multiple communications within a wide variety of networks and protocol types, including wired networks, for example, local area network (LAN), cable, etc., and wireless networks, such as Wireless LAN, cellular, device to device (D2D) communication networks, Wi-Fi networks, LTE, cellular networks, and so on. The modules 308 include routines, programs, objects, components, data structures, and so on, which perform particular tasks, functions or implement particular abstract data types. In one implementation, the modules 308 may include a device operation module 310. The device operation module 310 can be configured the length of the DRX timer (xTimer) in the UE, and the amount of time that the UE remains in active state while the DRX timer is running.

Figure 4:
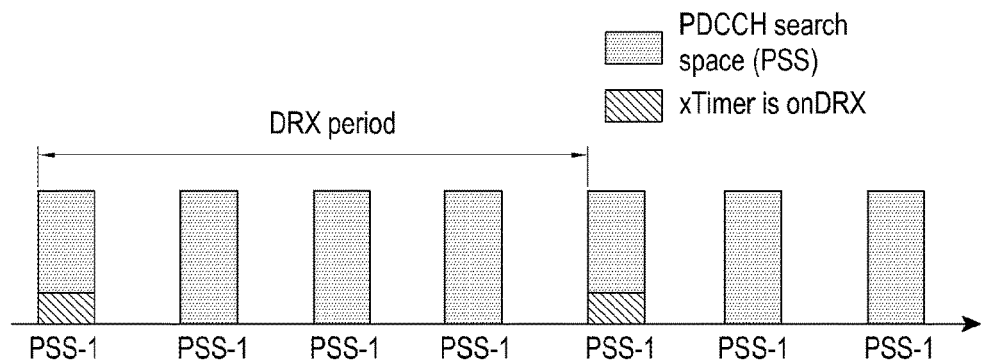
FIG. 4 illustrates an example length of a xTimer is one PDCCH search space interval according to embodiments of the present disclosure.

In an embodiment herein, the length of the xTimer can be configured as one PDCCH search space length of the UE (as illustrated in FIG. 4). The PDCCH search space length is the interval between the PDCCH occasions to the ending subframe of the same PDCCH search space. The UE 300 can remain in active state while the xTimer is running/on.

Figure 5:
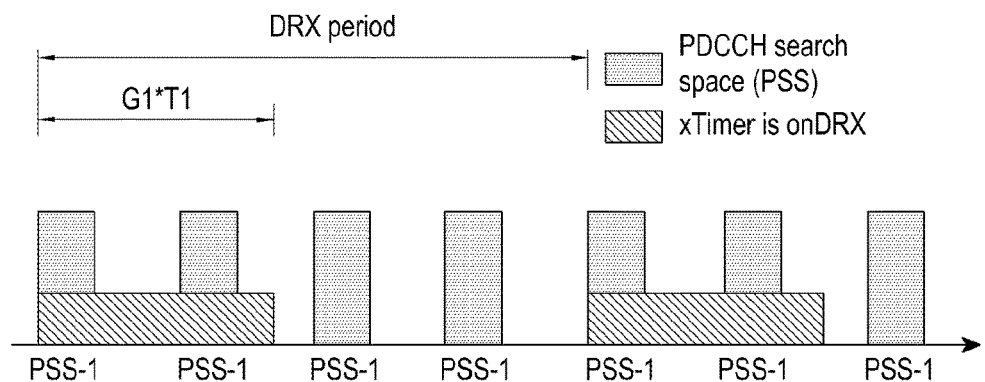
FIG. 5 illustrates an example length of a xTimer is given by G1*T1 according to embodiments of the present disclosure.

In an embodiment herein, the length of the xTimer can be configured as an integral multiple of factor T1 (as illustrated in FIG. 5):

$$length(xTimer)=G1*T1.$$

T1 can be at least one of: the interval between the PDCCH occasion to the ending sub-frame of the same PDCCH search space (PDCCH search space length);the interval between the two consecutive PDCCH occasions of the UE (referred to as PDCCH search space interval); slot or mini-slot duration (whichever is configured for the UE); or a value configured by base station via broadcast signaling.

G1 is an integer and can be configured by the base station via dedicated signaling, or can be configured by the base station using broadcast signaling. A base station can provide coverage enhancement level specific values of G1.

The UE 300 can remain in active state while the xTimer is running/on.

Figure 6:
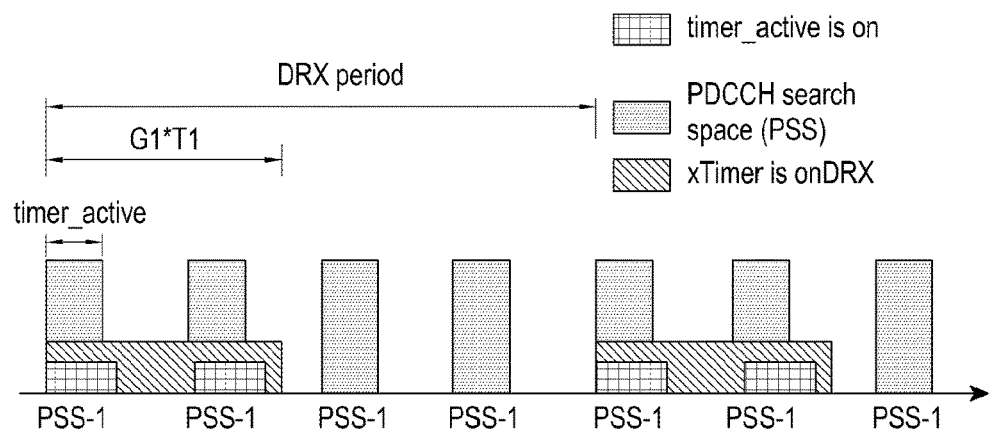
FIG. 6 illustrates an example length of a xTimer is given by G2*T2 and timer_ active started at each PDCCH search space instance while the xTimer is running according to embodiments of the present disclosure.

In an embodiment herein, the length of the xTimer can be configured as an integral multiple of factor T2 (as illustrated in FIG. 6):

$$length(xTimer)=G2*T2.$$

T2 can be at least one of:
the interval between the PDCCH occasion to the ending sub-frame of the same PDCCH search space (PDCCH search space length);the interval between two consecutive PDCCH occasions of the UE (referred to as PDCCH search space interval);slot or mini-slot duration (whichever is configured for the UE); or a value configured by base station via broadcast signaling.

G2 is an integer and can be configured by the base station via dedicated signaling, or can be configured by the base station using broadcast signaling. Base station can provide coverage enhancement level specific values of G2.

While xTimer is running/on, the UE starts/restarts timer_active at the PDCCH occasion of UE. The duration of timer_active can be at least one of:configured by the base station using dedicated/broadcast signaling;
the interval between the PDCCH occasion to the ending sub-frame of the same PDCCH search space (one PDCCH search space length); or
slot or mini-slot length (whichever is configured for the UE).

The UE 300 can remain in active state while the timer_active is running/on.

Consider a case where the xTimer is the onDurationtimer. The UE can configure the starting sub-frame of the onDurationTimer and the UE's stoppage criteria.

Figure 7:
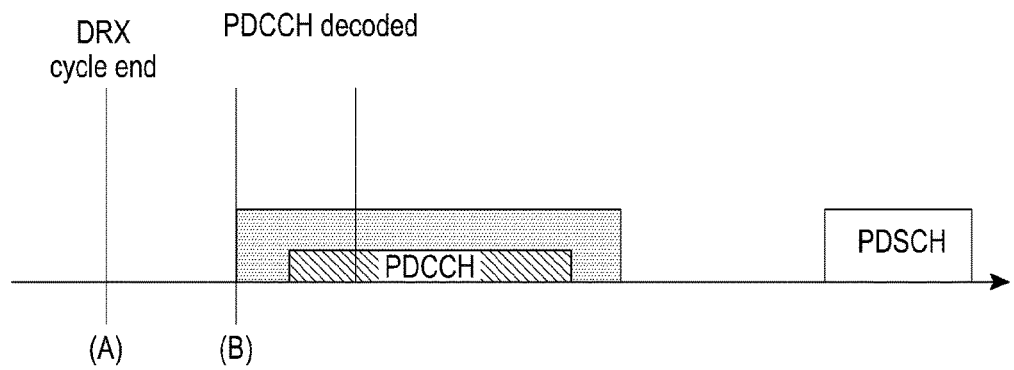
FIG. 7 illustrates an example selection of a starting sub-frame configuration of an onDurationTimer according to embodiments of the present disclosure.

The starting sub-frame configuration of onDurationTimer can be selected according to at least one of the following criteria:
as the starting sub-frame of drxCycle of the UE 300, wherein the UE 300 starts the onDurationTimer at the starting sub-frame of each drxCycle (as illustrated by (A) in FIG. 7); or
as the first PDCCH occasion which arrives after the start of drxCycle of the UE (as illustrated by (B) in FIG. 7).

Figure 8:
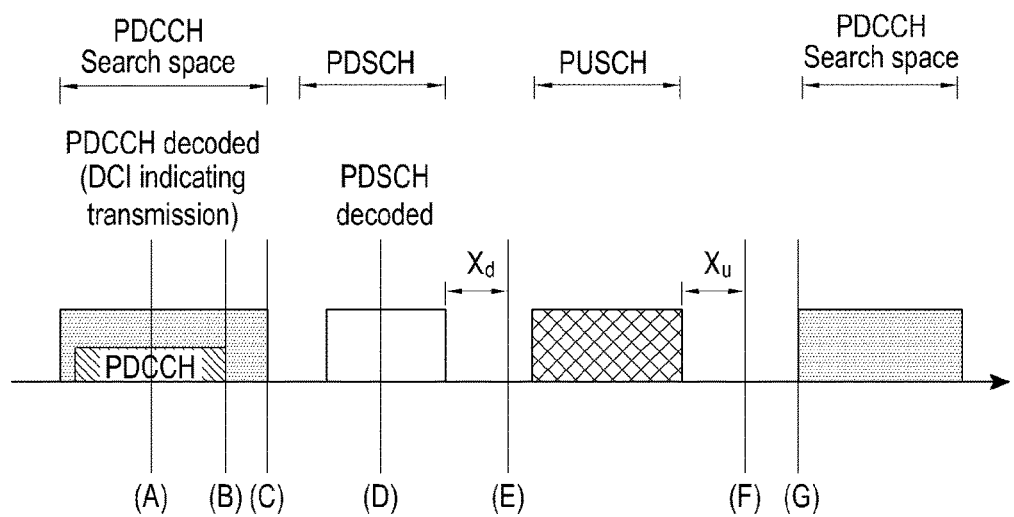
FIG. 8 illustrates an example selection of a time stoppage criteria for an onDurationTimer according to embodiments of the present disclosure.

The UE 300 can stop the xTimer either on onDuration-Timer expiry or according to at least one of the following criteria:
at the sub-frame where a PDCCH, indicating scheduled transmission for the UE, is successfully decoded (as illustrated by (A) in FIG. 8);
at the ending sub-frame of a PDCCH transmission indicating scheduled transmission for the UE (as illustrated by (B) in FIG. 8);

at the ending sub-frame of the PDCCH search space in which a PDCCH transmission indicates scheduled transmission for the UE (as illustrated by (C) in FIG. 8);
at the sub-frame where a PDSCH addressed to the UE is successfully decoded (as illustrated by (D) in FIG. 8);
a first pre-defined period ($X_d$ ms) later than the ending sub-frame of a PDSCH transmission which is addressed to the UE, where $X_d$ is a pre-defined value and is an integer value greater than or equal to zero (as illustrated by (E) in FIG. 8);
a second pre-defined time period ($X_u$ ms) later than the ending sub-frame of a PUSCH transmission by the UE, where $X_u$ is pre-defined value and has an integer value greater than or equal to zero (as illustrated by (F) in FIG. 8);at the first PDCCH occasion which arrives $X_d$ ms later than the end of PDSCH transmission which is addressed to the UE (as illustrated by (G) in FIG. 8); and
at the first PDCCH occasion, which arrives $X_u$ ms later than the end of PUSCH transmission by the UE (as illustrated by (G) in FIG. 8).

Figure 9:
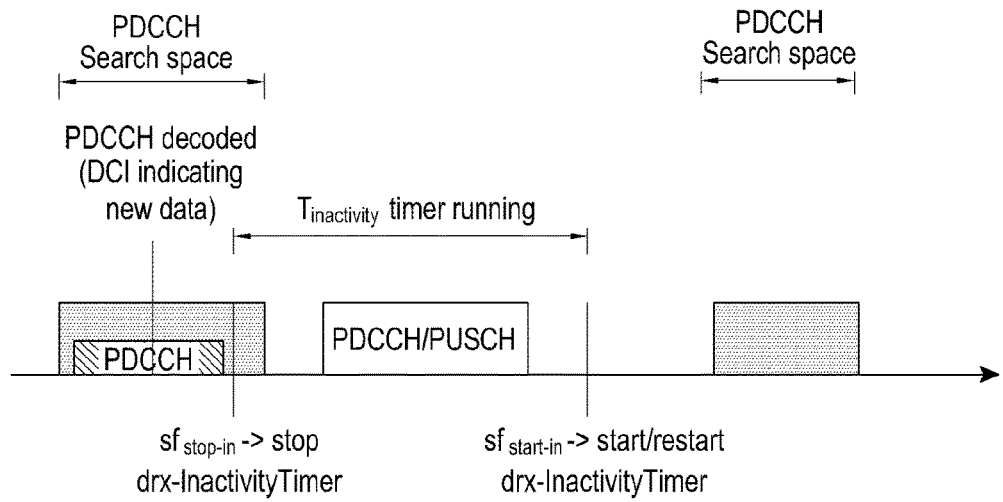
FIG. 9 illustrates an example drx-InactivityTimer procedure according to embodiments of the present disclosure.
Figure 10:
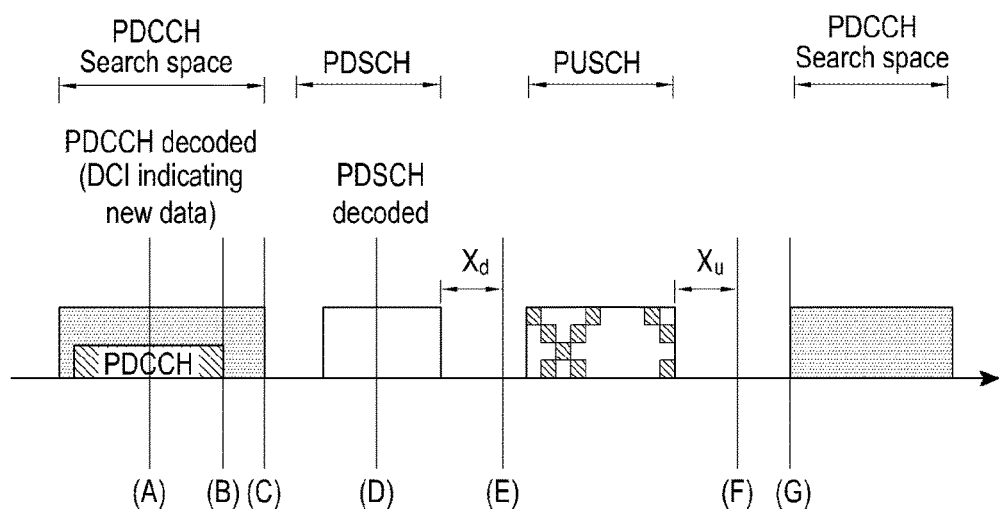
FIG. 10 illustrates an example sfstop-in configuration criteria according to embodiments of the present disclosure.

Consider a case where the xTimer is the drx-Inactivity-timer. The UE 300 performs the following procedure (as illustrated in FIG. 9), on receiving a PDCCH containing DCI indicating a new transmission for the UE 300:
if drx-InactivityTimer is running, drx-InactivityTimer is stopped at sub-frame $sf_{stop-in}$; and
drx-InactivityTimer is started/restarted at subframe $sf_{start-in}$
timer $T_{inactivity}$ can be activated by UE to monitor the $sf_{start-in}$ occasion, such that $T_{inactivity}$ is started at sub-frame $sf_{stop-in}$ and sf the timer expires at $sf_{start-in}$. The value of $sf_{stop-in}$ can be defined by at least one of the following criteria:
the sub-frame where PDCCH, containing the DCI indicating transmission for the UE 300, is
successfully decoded (as illustrated by (A) in FIG. 10); the ending sub-frame of the PDCCH transmission containing the DCI indicating transmission for
the UE 300 is decoded (as illustrated by (B) in FIG. 10);
the ending sub-frame of the PDCCH search space in which the PDCCH transmission, containing the DCI indicating transmission for the UE 300, is successfully decoded (as illustrated by (C) in FIG. 10);
the sub-frame where a PDSCH, which is scheduled by the DCI indicating transmission for the UE, is successfully decoded (as illustrated by (D) in FIG. 10);
the sub-frame which is $X_d$ ms later than the ending sub-frame of a PDSCH transmission which is scheduled by the DCI indicating transmission for the UE 300 (as illustrated by (E) in FIG. 10);
the sub-frame which is $X_u$ ms later than the ending sub-frame of a PUSCH transmission which is scheduled by the DCI indicating transmission for the UE 300 (as illustrated by (F) in FIG. 10). Note that value of $X_u$ can be different for the case when PUSCH is used for data transmission and when PUSCH is used for HARQ ACK transmission;
the first PDCCH occasion which arrives $X_d$ ms later than the end of PDSCH transmission which is scheduled by the DCI indicating transmission for the UE 300 (as illustrated by (G) in FIG. 10); and
the first PDCCH occasion which arrives $X_u$ ms later than the end of PUSCH transmission which is scheduled by the DCI indicating transmission for the UE 300 (as illustrated by (G) in FIG. 10). Note that value of $X_u$ can be different for the case when PUSCH is used for data transmission and when PUSCH is used for HARQ ACK transmission. The $T_{inactivity}$ timer can expire at the same sub-frame as the HARQ RTT Timer or the UL HARQ RTT Timer.

Figure 11:
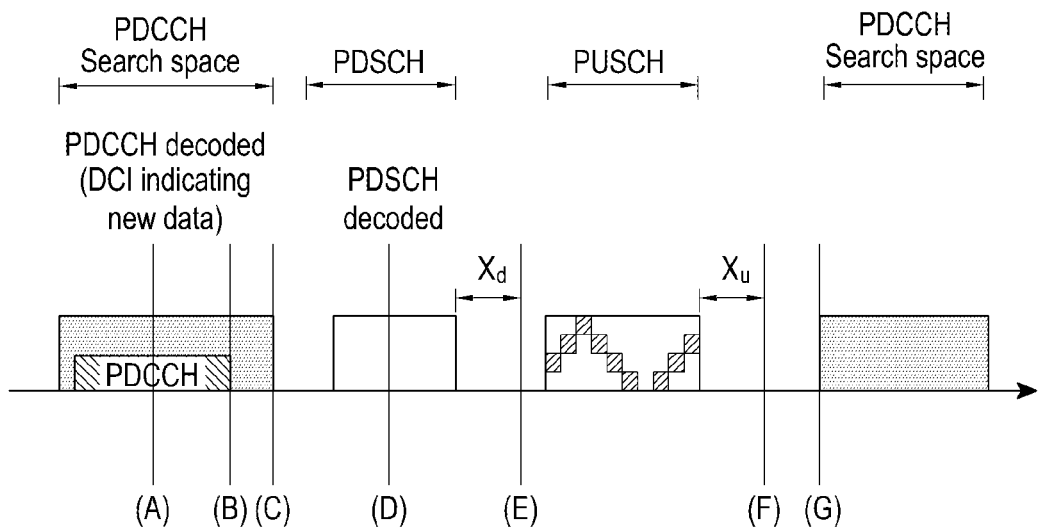
FIG. 11 illustrates an example sfstart-in configuration criteria according to embodiments of the present disclosure.

The value of sf$_{start-in}$ can be defined by one or more of the following criteria:

the sub-frame where PDCCH, containing the DCI indicating transmission for the UE 300, is successfully decoded (as illustrated by (A) in FIG. 11);

the ending sub-frame of the PDCCH transmission containing the DCI indicating transmission for the UE 300 (as illustrated by (B) in FIG. 11);

the ending sub-frame of the PDCCH search space in which the PDCCH transmission, containing the DCI indicating transmission for the UE 300, is successfully decoded (as illustrated by (C) in FIG. 11);

the sub-frame where a PDSCH, which is scheduled by the DCI indicating transmission for the UE 300, is successfully decoded (as illustrated by (D) in FIG. 11);

the sub-frame which is $X_d$ ms later than the ending sub-frame of a PDSCH transmission which is scheduled by the DCI indicating transmission for the UE 300 (as illustrated by (E) in FIG. 11);

the sub-frame which is $X_u$ ms later than the ending sub-frame of a PUSCH transmission which is scheduled by the DCI indicating transmission for the UE 300 (as illustrated by (F) in FIG. 11). Note that value of $X_u$ can be different for the case when PUSCH is used for data transmission and when PUSCH is used for HARQ ACK transmission;

the first PDCCH occasion which arrives $X_d$ ms later than the end of PDSCH transmission which is scheduled by the DCI indicating transmission for the UE 300 (as illustrated by (G) in FIG. 11); and the first PDCCH occasion which arrives $X_u$ ms later than the end of PUSCH transmission which is scheduled by the DCI indicating transmission for the UE 300 (as illustrated by (G) in FIG. 11). Note that value of $X_u$ can be different for the case when PUSCH is used for data transmission and when PUSCH is used for HARQ transmission.

Figure 12:
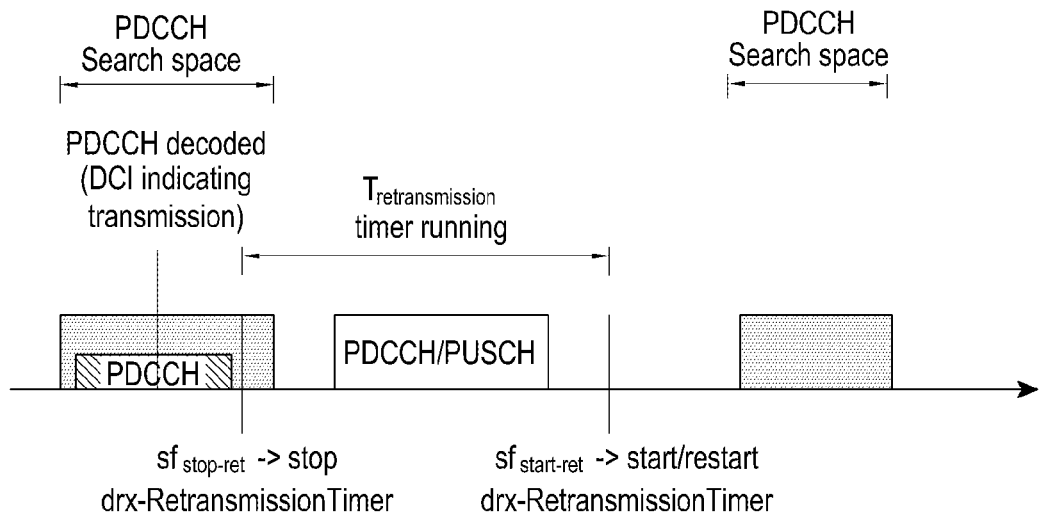
FIG. 12 illustrates an example drx-RetransmissionTimer procedure according to embodiments of the present disclosure.

In an embodiment herein, consider that the UE 300 receives a PDCCH containing DCI indicating a transmission for a hybrid automatic request (HARQ) process of the UE 300 (as illustrated in FIG. 12). If drx-RetrasmissionTimer is running for the corresponding HARQ process, the UE 300 stops the drx-RetransmissionTimer for the HARQ process at sub-frame sf$_{stop-ret}$. The UE 300 initiates timer T$_{retransmission}$ for the corresponding HARQ process such that T$_{retransmission}$ is started at sub-frame sf$_{stop-ret}$ and the timer expires at sf$_{start-ret}$. At sf$_{start-ret}$ occasion, if transmission corresponding to the HARQ process was not successfully decoded, drx-RetransmissionTimer for the corresponding HARQ process is started/restarted.

In an embodiment herein, the term "drx-Retransmission-Timer" can also be referred to as drx-RetransmissionTimer or drx-ULRetransmissionTimer.

Figure 13:
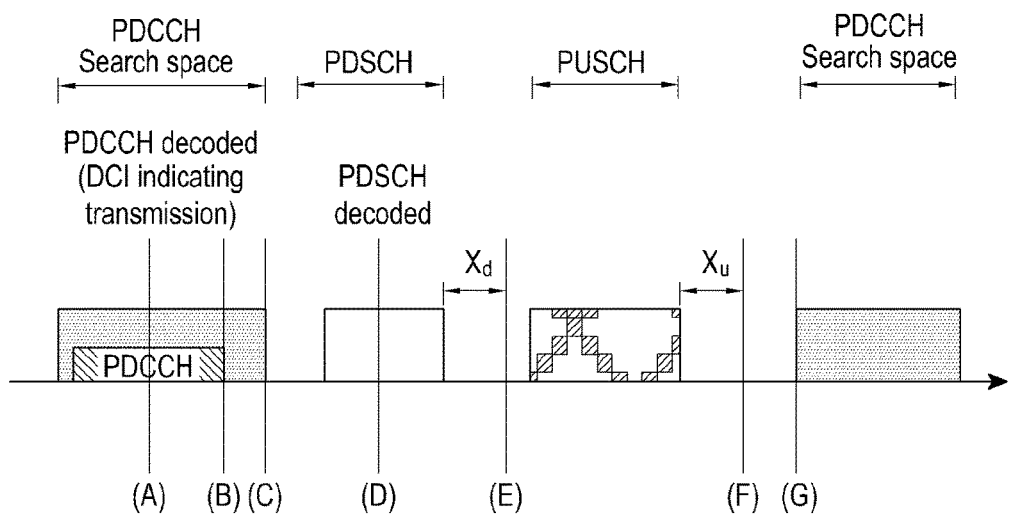
FIG. 13 illustrates an example sfstop-ret configuration criteria according to embodiments as disclosed herein.

The UE 300 can define the value of sf$_{stop-ret}$ using at least one of the following criteria (as illustrated in FIG. 13):

the sub-frame where PDCCH, containing the DCI indicating transmission for the corresponding HARQ process of the UE 300, is successfully decoded (as illustrated by (A) in FIG. 13);

the ending sub-frame of the PDCCH transmission containing the DCI indicating transmission for the corresponding HARQ process of the UE 300 (as illustrated by (B) in FIG. 13);

the ending sub-frame of the PDCCH search space in which the PDCCH transmission, containing the DCI indicating transmission for the corresponding HARQ process of the UE 300, is successfully decoded (as illustrated by (C) in FIG. 13);

the sub-frame where a PDSCH, which is scheduled by the DCI indicating transmission for the corresponding HARQ process of the UE 300, is successfully decoded (as illustrated by (D) in FIG. 13);

the sub-frame which is $X_d$ ms later than the ending sub-frame of a PDSCH transmission which is scheduled by the DCI indicating transmission for the corresponding HARQ process of the UE 300 (as illustrated by (E) in FIG. 13);

the sub-frame which is $X_u$ ms later than the ending sub-frame of a PUSCH transmission which is scheduled by the DCI indicating transmission for the corresponding HARQ process of the UE 300 (as illustrated by (F) in FIG. 13). Note that value of $X_u$ can be different for the case when PUSCH is used for data transmission and when PUSCH is used for HARQ ACK transmission;

the first PDCCH occasion which arrives $X_d$ ms later than the end of PDSCH transmission which is scheduled by the DCI indicating transmission for the corresponding HARQ process of the UE 300 (as illustrated by (G) in FIG. 13);

the first PDCCH occasion which arrives $X_u$ ms later than the end of PUSCH transmission which is scheduled by the DCI indicating transmission for the corresponding HARQ process of the UE 300 (as illustrated by (G) in FIG. 13). Note that value of $X_u$ can be different for the case when PUSCH is used for data transmission and when PUSCH is used for HARQ ACK transmission.

In an embodiment herein, the T$_{retransmission}$ timer expires at the same sub-frame as the HARQ RTT Timer and the UL HARQ RTT Timer.

Figure 14:
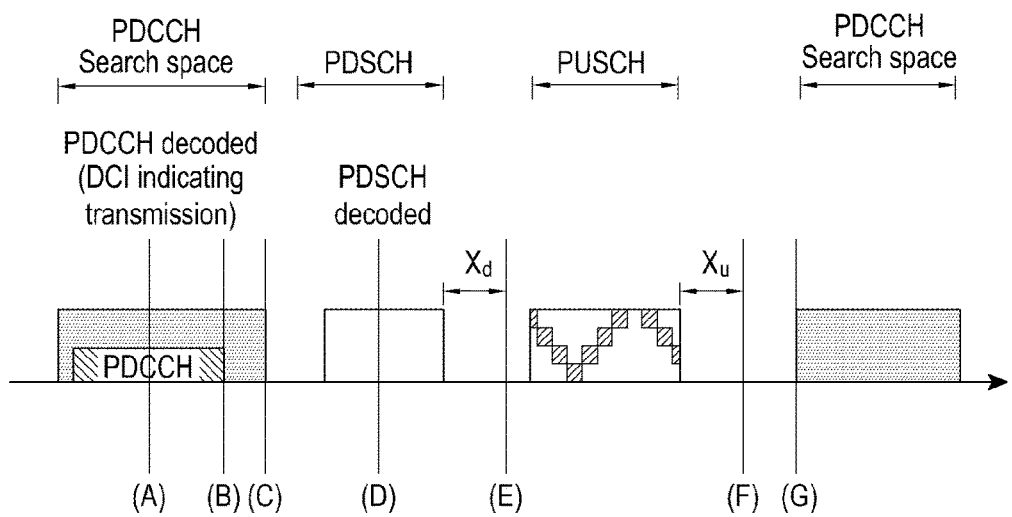
FIG. 14 illustrates an example sfstart-ret configuration criteria according to embodiments of the present disclosure.

The value of sf$_{start-ret}$ can defined by at least one of the following criteria (as illustrated in FIG. 14):

the sub-frame where PDCCH, containing the DCI indicating transmission for the corresponding HARQ process of the UE 300, is successfully decoded (as illustrated by (A) in FIG. 14);

the ending sub-frame of the PDCCH transmission containing the DCI indicating transmission for the corresponding HARQ process of the UE 300 (as illustrated by (B) in FIG. 14);

the ending sub-frame of the PDCCH search space in which the PDCCH transmission, containing the DCI indicating transmission for the corresponding HARQ process of the UE 300, is successfully decoded (as illustrated by (C) in FIG. 14);

the sub-frame where a PDSCH, which is scheduled by the DCI indicating transmission for the corresponding HARQ process of the UE 300, is successfully decoded (as illustrated by (D) in FIG. 14);

the sub-frame which is $X_d$ ms later than the ending sub-frame of a PDSCH transmission which is scheduled by the DCI indicating transmission for the corresponding HARQ process of the UE 300 (as illustrated by (E) in FIG. 14);

the sub-frame which is $X_u$ ms later than the ending sub-frame of a PUSCH transmission which is scheduled by the DCI indicating transmission for the corresponding HARQ process of the UE 300 (as illustrated by (F) in FIG. 14). Note that value of $X_u$ can be different for the case when PUSCH is used for data transmission and when PUSCH is used for HARQ ACK transmission;

the first PDCCH occasion which arrives $X_d$ ms later than the end of PDSCH transmission which is scheduled by the DCI indicating transmission for the corresponding HARQ process of the UE 300 (as illustrated by (G) in FIG. 14); and the first PDCCH occasion which arrives $X_u$ ms later than the end of PUSCH transmission which is scheduled by the DCI indicating transmission for the corresponding HARQ process of the UE 300 (as illustrated by (G) in FIG. 14). Note that value of $X_u$ can be different for the case when PUSCH is used for data transmission and when PUSCH is used for HARQ ACK transmission.

Figure 15:
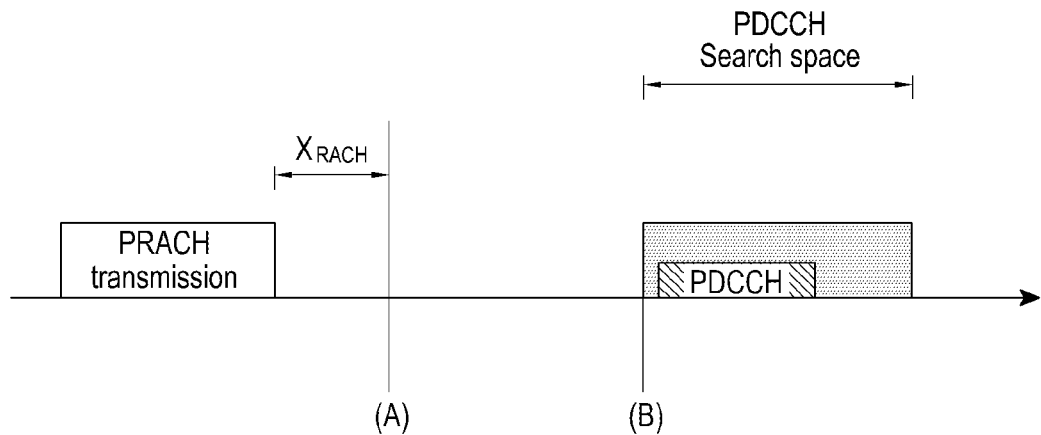
FIG. 15 illustrates an example start sub-frame configuration of an ra-ResponseTimer according to embodiments of the present disclosure.

In an embodiment herein, the UE 300 can configure the starting sub-frame of the ra-ResponseTimer and the UE's stoppage criteria. The start frame of ra-ResponseTimer can be selected as at least one of:

the sub-frame which is a third pre-defined time period ($X_{RACH}$ ms) later than the ending sub-frame of a PRACH transmission, where $X_{RACH}$ value is pre-defined and is an integer value greater than or equal to zero (as illustrated by (A) in FIG. 15); or the first PDCCH occasion which arrives after $X_{RACH}$ ms later than the ending sub-frame of PRACH transmission (as illustrated by (B) in FIG. 15).

Figure 16:
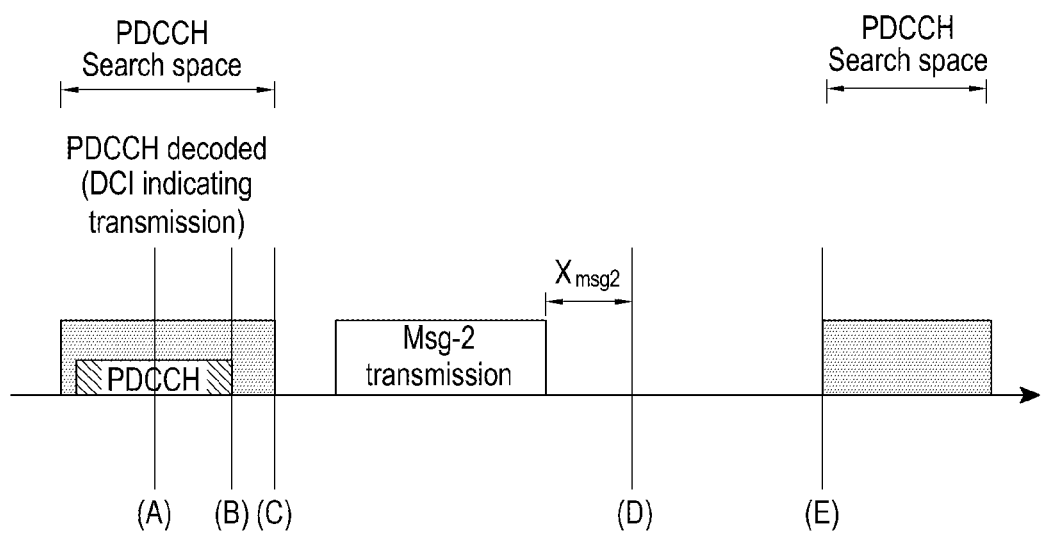
FIG. 16 illustrates an example selection of a time stoppage criteria for an onDurationTimer according to embodiments of the present disclosure.

The ra-ResponseTimer can be stopped at either timer expiry or according to at least one of the following criteria:

the ra-ResponseTimer can be stopped at the sub-frame where a PDCCH, addressed to the RA-RNTI of the PRACH transmitted by the UE 300, is successfully decoded (as illustrated by (A) in FIG. 16);

the ra-ResponseTimer can be stopped at the ending sub-frame of a PDCCH transmission addressed to the Random Access Radio Network Temporary Identifier (RNTI) (RA-RNTI) of the PRACH transmitted by the UE 300 (as illustrated by (B) in FIG. 16);

the ra-ResponseTimer can be stopped at the ending sub-frame of the PDCCH search space in which a PDCCH transmission is addressed to the RA-RNTI of the PRACH transmitted by the UE 300 (as illustrated by (C) in FIG. 16);

the ra-ResponseTimer can be stopped at a fourth pre-defined time period ($X_{msg2}$ ms) later than the ending sub-frame of Msg-2 transmission which is scheduled by the PDCCH addressed to RA-RNTI of the PRACH transmitted by the UE 300, where $X_{msg2}$ can be pre-defined and is an integer value greater than or equal to zero (as illustrated by (D) in FIG. 16); and the ra-ResponseTimer can be stopped at the first PDCCH occasion which arrives $X_{msg2}$ ms later than the end of Msg-2 transmission which is scheduled by the PDCCH addressed to the RA-RNTI of the PRACH transmitted by the UE 300 (as illustrated by (E) in FIG. 16).

In an embodiment herein, the UE 300 can select the starting sub-frame of the mac-ContentionResolutionTimer as at least one of: the sub-frame which is a fifth pre-defined time period ($X_{msg3}$ ms) later than the ending sub-frame of a Msg-3 transmission, where $X_{msg3}$ can be pre-defined and can be an integer value greater than or equal to zero; or the first PDCCH occasion which arrives after $X_{msg3}$ ms later than the ending sub-frame of Msg-3 transmission.

In an embodiment herein, the UE 300 can configure the drxCycle. The UE 300 can configure the length of the drxCycle as an integral multiple of T3.

$$\text{length(drxCycle)}=G3*T3$$

Figure 17A:
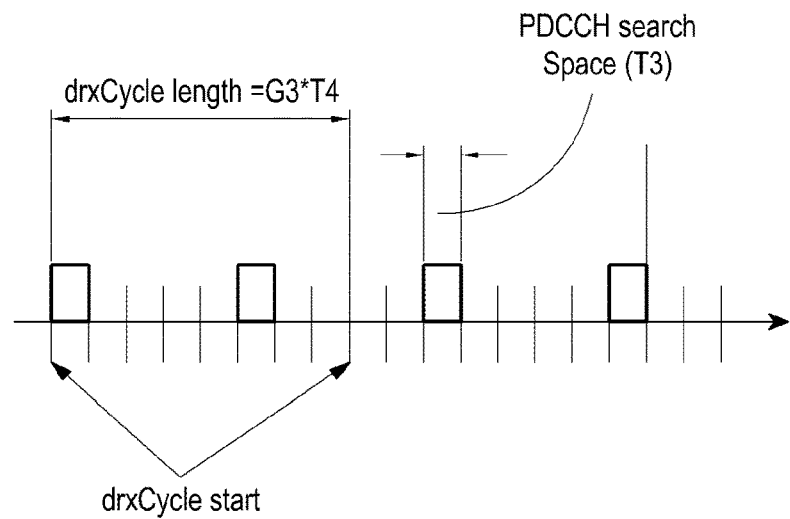
FIG. 17A illustrates an example T3 set as PDCCH search space length according to embodiments of the present disclosure.
Figure 17B:
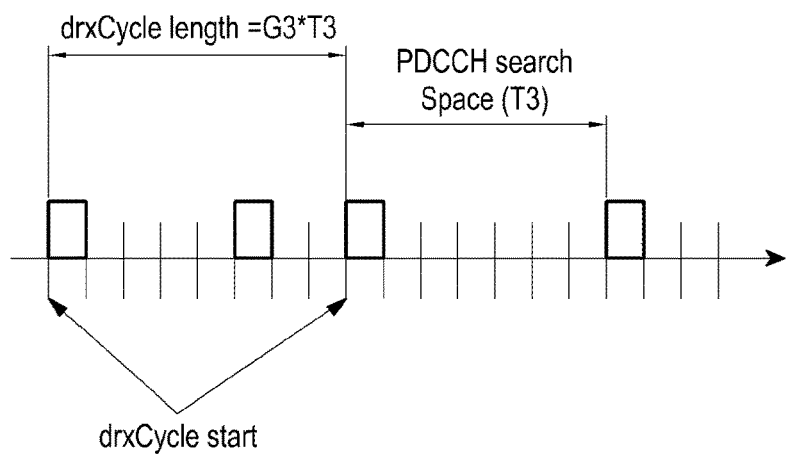
FIG. 17B illustrates an example T3 set as PDCCH search space interval according to embodiments of the present disclosure.
Figure 17C:
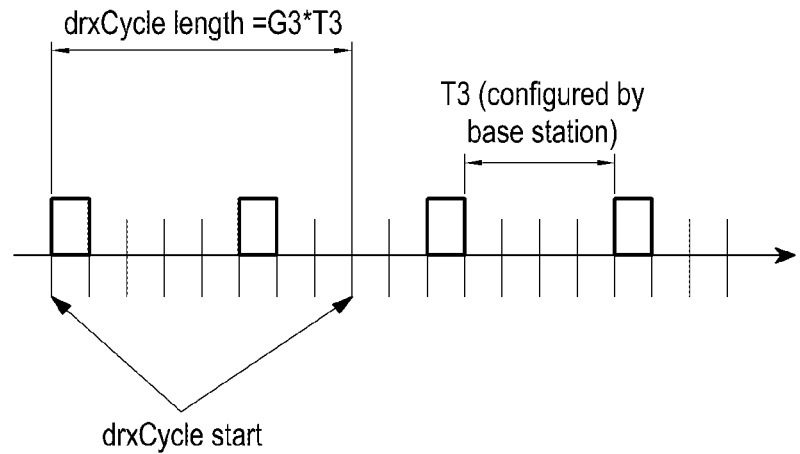
FIG. 17C illustrates an example T configured by a base station according to embodiments of the present disclosure.

T3 can be at least one of:

the interval between the PDCCH occasion to the ending sub-frame of the same PDCCH search space (PDCCH search space length) (as illustrated in FIG. 17A);

the interval between two consecutive PDCCH occasions of the UE 300 (PDCCH search space interval) (as illustrated in FIG. 17B);

one slot or mini-slot (whichever is configured for the UE); or as configured by the base station via broadcast signaling (as illustrated in FIG. 17C).

The base station via dedicated signaling, or via broadcast signaling can configure the value of G3. The base station may broadcast coverage enhancement level specific values.

The starting sub-frame of drxCycle can be configured as the sub-frame which satisfies the following equation:

$$[(SFN*10)+sf-SS\_Offset] \text{ modulo } DRX = drxStartOffset \text{ modulo } DRX$$

where,
SFN=System frame number;
sf=sub-frame number within a system frame;
SS_Offset=PDCCH search space offset from sub-frame 0;
DRX=length of drxCycle in sub-frames; and
drxStartOffset=Offset of starting sub-frame of drxCycle from sub-frame 0, drxStartOffset can be an integral multiple of PDCCH search space interval. The value of drxStartOffset can be provided by the base station via dedicated signaling or by broadcast signaling.

The base station can broadcast coverage enhancement level specific values. The value of drxStartOffset can be derived as:

$$\text{drxStartOffset}=T_{ss}*(UE\_ID \text{ mod } DRX/T_{ss})$$

where, $T_{ss}$ is the PDCCH search space interval; and
UE_ID=IMSI mod 1024.

In an embodiment herein, the UE can configure the length of timer drxCycleTimer as an integral multiple of factor T4:

$$\text{length(drxCycleTimer)}=G4*T4.$$

Figure 18A:
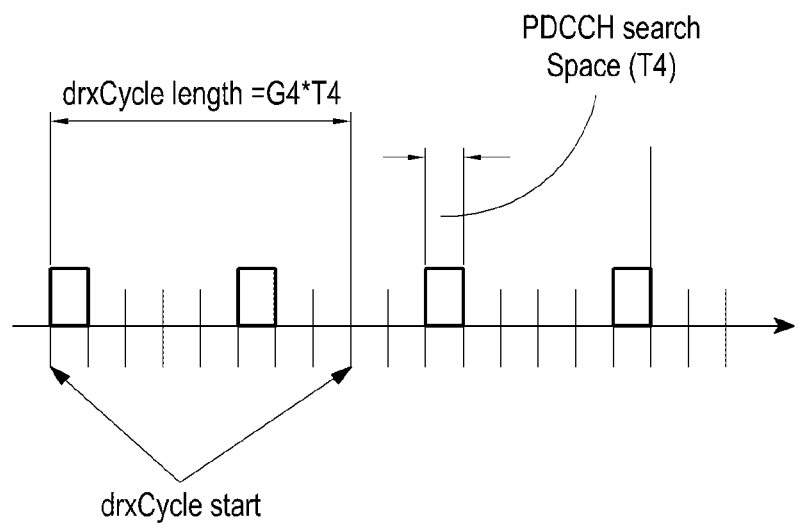
FIG. 18A illustrates an example T4 set as PDCCH search space length according to embodiments of the present disclosure.
Figure 18B:
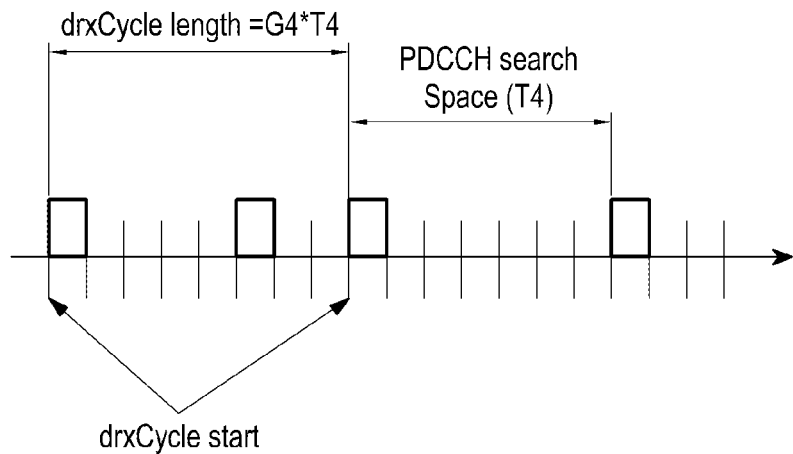
FIG. 18B illustrates an example T4 set as PDCCH search space interval according to embodiments of the present disclosure.
Figure 18C:
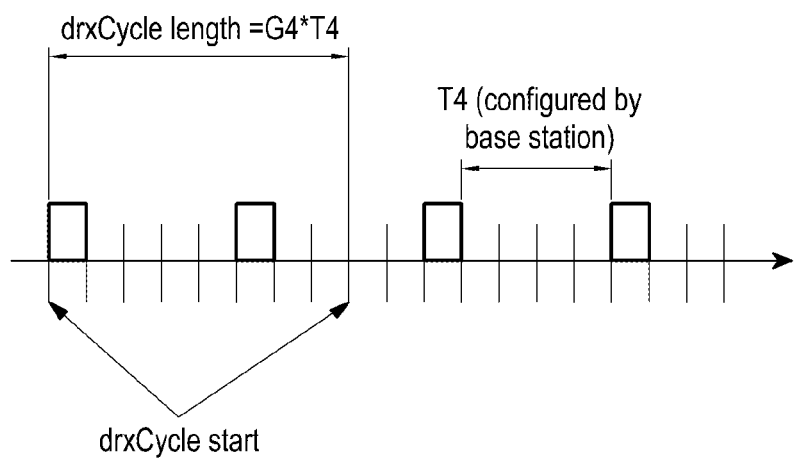
FIG. 18C illustrates an example T4 configured by a base station according to embodiments of the present disclosure.

T4 can be defined as any one of the following:
the interval between the PDCCH occasion to the ending sub-frame of the same PDCCH search space (PDCCH search space length) (as illustrated in FIG. 18A);

the interval between two consecutive PDCCH occasions of the UE (PDCCH search space interval) (as illustrated in FIG. 18B);

one slot or mini-slot (whichever is configured for the UE); or as configured by base station via dedicated signaling or broadcast signaling (as illustrated in FIG. 18C).

The base station via dedicated signaling, or via broadcast signaling can configure the value of G4. The base station can also broadcast coverage enhancement level specific values for G4.

The UE 300 can be in active state during PDSCH/PUSCH transmission scheduled for the UE irrespective of the status of other timers. The UE 300 is not required to monitor the PDCCH search space during an ongoing PDSCH or PUSCH transmission. The UE 300 is not required to be in active state during transmission gap interval of PDSCH or PDCCH or PUSCH scheduled for the UE.

The modules 308 may include programs or coded instructions that supplement applications and functions of the UE 300. The data 312, amongst other things, serves as a repository for storing data processed, received, and generated by one or more of the modules 308. Further, the names of the other components and modules of the UE 300 are illustrative and need not be construed as a limitation.

Embodiments herein enable the UE to save energy by optimally setting the start and stoppage criteria for the timers.

The embodiments disclosed herein can be implemented through at least one software program running on at least one hardware device and performing network management functions to control the elements. The elements shown in FIG. 1 can be at least one of a hardware device, or a combination of hardware device and software module.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for communicating by an internet of things (IoT) device in a wireless communication system, the method comprising:
   configuring a length of a drxCycle;
   configuring a starting subframe of the drxCycle;
   configuring, by the IoT device, a length of a first timer specifying a time in which the IoT device remains in an active state of discontinuous reception (DRX) operation;
   starting, by the IoT device, the first timer when a second timer expires;
   monitoring, by the IoT device, a physical downlink control channel (PDCCH); and
   stopping, by the IoT device, the first timer when the monitored PDCCH indicates a transmission for the IoT device,
   wherein the starting subframe of the drxCycle is determined by [(SFN*10)+sf−SS_Offset]modulo DRX=drxStartOffset modulo DRX where an SFN is a system frame number, an sf is a subframe number within a system frame, an SS_Offset is a PDCCH search space offset from a subframe 0, a DRX is a length of a drxCycle in a subframe, and a drxStartOffset is an offset of the starting subframe of the drxCycle from the subframe 0.

2. The method of claim 1, wherein the length of the first timer is configured by multiplying a PDCCH period.

3. The method of claim 1, wherein the length of the first timer is configured as a value T1*G1,
   wherein T1 is at least one of a PDCCH search space length, a PDCCH period, a slot duration, a mini-slot duration, or a value configured by a base station, and
   wherein G1 is an integer value configured by the base station.

4. The method of claim 1, further comprising starting a timer_active at a starting subframe of each PDCCH search space,
   wherein a duration of the timer_active is configured, by a base station, as at least one of one PDCCH search space length, a slot length, or a mini-slot length.

5. The method of claim 1, wherein the first timer comprises a drx-InactivityTimer.

6. The method of claim 1, wherein the length of the drxCycle is configured as a value that is multiplied by a T3 and a G3,
   wherein the T3 is at least one of a PDCCH search space length, a PDCCH period, a slot duration, a mini-slot duration, or a value configured by a base station, and
   wherein the G3 is an integer configured by the base station.

7. The method of claim 1, further comprising:
   selecting the drxStartOffset as an integer multiple value of a PDCCH period provided by a base station, and
   wherein the drxStartOffset is determined by:
   drxStartOffset=Tss * (UE_ID mod DRX/Tss) where a Tss is the PDCCH period and a UE_ID =IMSI mod 1024.

8. The method of claim 1, further comprising:
   configuring a length of a drxCycleTimer as a value T4*G4,
   wherein T4 is at least one of a PDCCH search space length, a PDCCH period, a slot duration, a mini-slot duration, or a value configured by a base station, and
   wherein G4 is an integer value configured by the base station.

9. The method of claim 1, further comprising:
   selecting a starting subframe of an mac-ContentionResolutionTimer as at least one of a subframe that is a fifth pre-defined time period later than an ending subframe of a Msg-3 transmission, or a first PDCCH occasion that arrives at the fifth pre-defined time period later than an ending subframe of Msg-3 transmission.

10. The method of claim 1, wherein the second timer comprises a hybrid automatic request (HARQ) retransmission (RTT) timer or an uplink (UL) HARQ RTT timer.

11. A internet of things (IoT) device in a wireless communication system, the IoT device comprises:
    at least one processor configured to:
       configure a length of a drxCycle;
       configure a start subframe of the drxCycle;
       configure a length of a first timer, the first timer specifying a time in which the IoT device remains in an active state of discontinuous reception (DRX) operation;
       start the first timer when a second timer expires;
       monitor a physical downlink control channel (PDCCH); and
       stop the first timer, when the monitored PDCCH indicates a transmission for the IoT device,
    wherein the starting subframe of the drxCycle is determined by [(SFN*10)+sf−SS_Offset] modulo DRX=drxStartOffset modulo DRX where an SFN is system frame number, an sf is a subframe number within a system frame, an SS_Offset is a PDCCH search space offset from a subframe 0, a DRX is a length of a drxCycle in subframe, and a drxStartOffset is an offset of the starting subframe of the drxCycle from the subframe 0.

12. The IoT device of claim 11, wherein the length of the first timer is configured by multiplying a PDCCH period.

13. The IoT device of claim 11, wherein the length of the first timer is configured as a value T1*G1,
    wherein T1 is at least one of a PDCCH search space length, a PDCCH period, a slot duration, a mini-slot duration, or a value configured by a base station, and
    wherein the G1 is an integer value configured by the base station.

14. The IoT device of claim 11, wherein the first timer comprises a drx-InactivityTimer.

15. The IoT device of claim 11, wherein the second timer comprises a hybrid automatic request (HARQ) retransmission (RTT) timer or an uplink (UL) HARQ RTT timer.

* * * * *